United States Patent [19]

Hull

[11] 3,885,389

[45] May 27, 1975

[54] MANIFOLD WITH INTERNAL FILTER

[75] Inventor: James S. Hull, Waterford, Mich.

[73] Assignee: Melvin Corporation, Bay City, Mich.

[22] Filed: Sept. 26, 1973

[21] Appl. No.: 400,784

[52] U.S. Cl. ............................ 60/453; 60/DIG. 10
[51] Int. Cl. ........................................... F15b 15/18
[58] Field of Search ...... 60/336, 453, 468, DIG. 10; 92/78

[56] References Cited
UNITED STATES PATENTS

| | | | |
|---|---|---|---|
| 2,543,989 | 3/1951 | Rockwell | 60/453 X |
| 2,566,633 | 9/1951 | Rathmann | 60/468 X |
| 3,217,493 | 11/1965 | Kempson et al. | 60/468 X |
| 3,357,179 | 12/1967 | Gourlay et al. | 60/DIG. 10 |

*Primary Examiner*—Edgar W. Geoghegan
*Attorney, Agent, or Firm*—Hugh L. Fisher

[57] ABSTRACT

A hydrostatic transmission drive has an integrated pump, valve and manifold interconnecting the pump and valve with a hydraulic actuator. The manifold has a replaceable filter cartridge located in a bore. The filter cartridge has a design capacity to eliminate normal amounts of contamination originally in, and entering into the system during the life of the drive, and is composed of a metallic fabric material that will not fail under pressure due to dirt build-up on the filter and will not itself disintegrate in time and add additional contamination to the hydraulic fluid.

4 Claims, 4 Drawing Figures

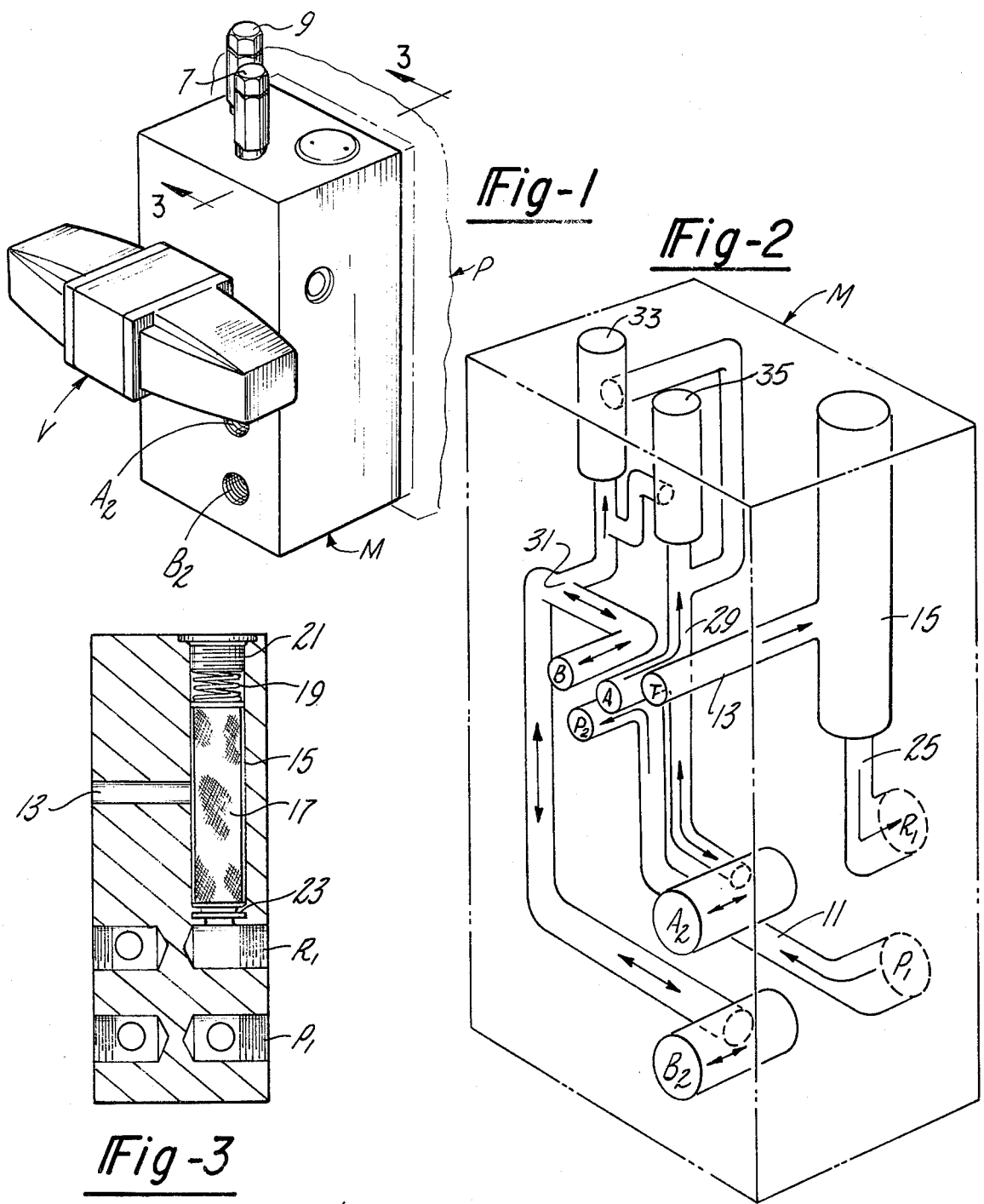
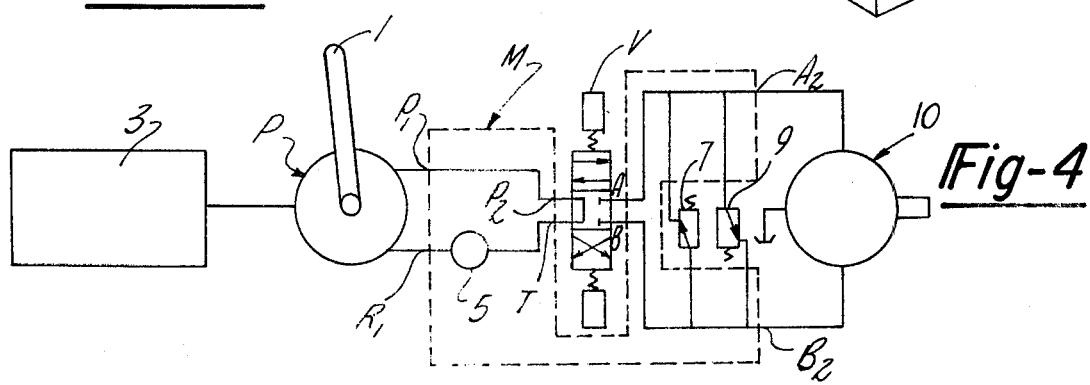

MANIFOLD WITH INTERNAL FILTER

This invention relates to hydrostatic drives and more particularly to hydrostatic drives having integrated pump, valve and filter components.

The efficiency of high pressure hydrostatic drives depends on almost absolute dirt-free hydraulic fluid. Even very small particles can cause damage and excessive wear to the precision parts particularly in a variable displacement pump. Conventional filtering does not necessarily solve the problem. A system must have a filter with sufficient capacity to collect not only the contamination present in the components when assembled into a system but must be able to handle dirt entering the system during operation. The mere changing of a filter will often cause introduction of dirt. Furthermore, a filter must have sufficient capacity to permit continuous flow therethrough since the use of a by-pass valve that opens upon the filter becoming blocked would defeat the purpose of the filter.

Conventional filters also can introduce contamination themselves into the system since after a period of time the filter material will begin to disintegrate and particles of the filter material will migrate into the fluid.

It therefore would be advantageous to provide an integrated hydraulic system that eliminated the disadvantages of convention filter applications by utilizing an integral compact filter that ordinarily does not need to be changed during the life of the apparatus and will provide absolute protection to the hydraulic components of the system. Such a system should minimize the use of external tubing and hoses and should permit easy changing of the filter if necessary without introduction of contamination into the system.

It is therefore an object of the invention to provide a hydraulic drive system having a self-contained filter.

Another object is to provide such a system having a manifold connecting the components of the drive and which contains a failsafe replaceable filter.

These and other objects and advantages will be readily apparent from the following description and accompanying drawing in which:

FIG. 1 is a perspective view of an integrated manifold, valve and pump drive;

FIG. 2 is an enlarged schematic and diagrammatic view of the manifold showing the various passages and ports therein;

FIG. 3 is a cross-sectional view taken on the line 3—3 of FIG. 1; and

FIG. 4 is a schematic showing of a complete drive system.

Referring to FIG. 1, a block-like manifold, generally indicated M, is attached to a pump or drive P. The details of the pump are not shown since they form no part of the invention. The pump P may comprise a variable displacement pump of any form. A valve assembly V is directly attached to the manifold as shown. The valve V preferably is a three-position four-way valve that is spring centered and actuated by solenoids into alternative forward or reverse drive positions. The valve V is shown schematically in FIG. 4. Details of the valve are also not shown since they form no part of the invention.

The pump P is driven by any suitable power source such as an electric motor 3. As seen in FIG. 4 an internal filter 5 is provided in the manifold as are external relief valves 7 and 9 (see FIG. 1). A dual direction actuator 10 is operatively hydraulically connected to the manifold M. The manifold M is represented in broken line outline in FIG. 4 with those components and passages within the manifold shown within the outline and those components and passages outside of the manifold shown outside of the outline. The pump pressure output is directed into a port P1 in the manifold and connects with a passage 11 leading to a valve port P2 opening directly into one of the four ports of the valve V. A tank or return port T also opens to the valve V and connects to a passage 13 leading to a bore 15. The bore 15 is adapted to receive a filter element or cartridge 17 which is biased by a spring 19 in turn urged by a plug or cap 21 against a seal member 23. The bottom of the bore 15 opens to a passage 25 leading to a pump return port R1.

The filter element 17 is constructed of a metallic filter fabric or material such as woven stainless steel cloth which will crush but will not break apart under load or permit contamination to pass through even when totally or partially blocked. The metallic filter element 17 is not susceptible to breakdown under conditions of high heat. It is a common occurrence in hydrostatic drives to have heat conditions high enough to cause failure of normal filter elements in time. Neither heat or length of life affects the metallic filter elements. By utilizing a metallic element the problem associated with disintegration of the filter element and the resulting contamination that results is alleviated. Despite efforts to clean components before they are assembled and used, there always remains the possibility of having dirt particles in the system. Once these have been removed, as by an internal filter, only such particles as are introduced from outside of the system need be filtered. In the present invention with an integral valve manifold and pump drive the leakage is reduced. Thus a smaller amount of make up fluid is needed and this can be effectively filtered by an external filter (not shown) in the fluid make up supply.

The filter element 17 is not intended to be a regularly serviced component but is intended to collect original dirt in the system as well as some additional dirt that may enter the system during the life of the system. If an unusual amount of dirt did enter the system, as during repair of an actuator 10 etc., the filter element 17 would provide full protection since no particles could bypass or blow through the filter element 17. The back pressure due to the filter element 17 being clogged would cause the relief valves 7 and 9 to blow and the reduced operation of the actuator driven component would be evident and the filter element 17 then checked and replaced. Under normal circumstances the filter element 17 merely serves as a safety device to prevent damage to the parts by the normal amount of dirt or contamination originally in or later entering the system. In any event the filter element 17 can easily be removed and replaced by removing plug 21 and spring 19.

There are two valve ports A and B in the manifold that also open to the valve V. The valve ports A and B open to passages 29 and 31 respectively which lead to ports A2 and B2 respectively. The valve ports A2 and B2 are adapted to receive couplings on high pressure lines leading to the actuator 10. The screw-in type relief valves 7 and 9, the details of which are not shown, are, respectively, connected to ports 33 and 35 in the manifold M, as shown in FIG. 2, and act to limit the pressure in passages 29 and 31 by dumping fluid from the high pressure passage to the lower pressure passage. When valve V is in its forward position port P2 is connected to valve port A and the valve 7 is effective to limit pressure in passage 29 and the actuator; whereas when V is in its reverse position, port P2 is connected to valve port B and valve 9 is effective to limit pressure in passage 31 and the actuator.

It will be seen that I have provided a compact hydrostatic drive with a simple yet efficient integrated pump drive, control valve, filter and relief valve system that can be preassembled and tested at the factory. Only the connections to the actuator need be made when installation of the drive is made. Modifications and changes will be readily apparent to those skilled in the art which are within the scope of the invention which is limited only by the following claims:

I claim:

1. A manifold assembly for connecting a hydraulic pump with a hydraulic actuator for driving the same in one direction or the other as determined by a four way valve, said manifold having a first set of ports adapted to be connected to the pump for receiving fluid under pressure from the pump and returning fluid to the pump, a second set of ports adapted to be connected to the actuator to direct fluid under pressure to the actuator and receive fluid from the actuator, first and second sets of valve ports adapted to be connected to the four-way valve, a plurality of passages in the manifold for connecting the first set of ports with the first pair of valve ports and for connecting the second set of ports with the second pair of valve ports, a bore in said manifold interposed in one of the plurality of passages connecting the four-way valve with one of the first set of ports so as to return fluid to the pump, and a removable filter cartridge in said bore located so as to filter fluid flowing from said four-way valve to pump.

2. The manifold assembly of claim 1 wherein a third set of ports are provided with each port thereof connected to one of the plurality of passages connecting said second set of ports with the second pair of valve ports, and relief valves connected to said third set of ports to limit the pressure in said last named passages.

3. The manifold assembly of claim 1 wherein said filter cartridge is made of a woven metallic material not susceptible to disintegration and hence migration of particles from the filter cartridge into the hydraulic fluid.

4. A hydrostatic drive assembly including a pump, a manifold mounted on the pump and hydraulically connected thereto, a control valve mounted on the manifold and hydraulically connected thereto, a hydraulic actuator hydraulically connected to the manifold, the manifold having a plurality of ports communicating with the pump and with the actuator, a plurality of valve ports communicating with the valve, a plurality of passages connecting certain ones of the plurality of ports to certain ones of the plurality of valve ports and connecting certain other ones of the plurality of ports to certain other ones of the plurality of valve ports so as to permit fluid to be transferred therethrough by way of the valve to and from the pump and to and from the actuator, a filter receiving bore in the manifold intercepting one of the plurality of passages for transferring fluid between the valve and the pump, and a replaceable metallic filter element positioned within the bore for filtering hydraulic fluid flowing through said last named passage.

* * * * *